(12) United States Patent
Hareng et al.

(10) Patent No.: US 7,848,968 B1
(45) Date of Patent: Dec. 7, 2010

(54) PROCESSING RETURNED RENTAL ITEMS

(75) Inventors: Sebastien Hareng, Los Gatos, CA (US); Andrew Rendich, San Ramon, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 12/022,938

(22) Filed: Jan. 30, 2008

Related U.S. Application Data (60) Provisional application No. 60/887,332, filed on Jan. 30, 2007.

(51) Int. Cl.
*G06Q 10/00* (2006.01)

(52) U.S. Cl. .................................... 705/28; 705/307

(58) Field of Classification Search .................. 705/28, 705/307
See application file for complete search history.

(56) References Cited

U.S. PATENT DOCUMENTS

| | | | |
|---|---|---|---|
| 7,024,381 B1 | 4/2006 | Hastings et al. | |
| 2004/0153413 A1 | 8/2004 | Gross | |
| 2004/0158503 A1 | 8/2004 | Gross | |
| 2004/0158504 A1 | 8/2004 | Gross | |
| 2004/0162783 A1 | 8/2004 | Gross | |
| 2004/0172274 A1 | 9/2004 | Gross | |
| 2004/0172275 A1 | 9/2004 | Gross | |
| 2004/0172342 A1 | 9/2004 | Gross | |
| 2004/0243479 A1 | 12/2004 | Gross | |
| 2004/0243480 A1 | 12/2004 | Gross | |
| 2004/0243527 A1 | 12/2004 | Gross | |
| 2004/0243570 A1 | 12/2004 | Gross | |
| 2004/0260600 A1 | 12/2004 | Gross | |
| 2004/0267669 A1 | 12/2004 | Gross | |
| 2005/0086127 A1* | 4/2005 | Hastings et al. | 705/26 |
| 2006/0026031 A1* | 2/2006 | Gentling | 705/1 |
| 2006/0036549 A1* | 2/2006 | Wu | 705/51 |
| 2006/0149685 A1 | 7/2006 | Gross | |
| 2006/0155575 A1 | 7/2006 | Gross | |
| 2006/0212367 A1* | 9/2006 | Gross | 705/27 |
| 2006/0235710 A1* | 10/2006 | Hodess et al. | 705/1 |
| 2006/0241967 A1 | 10/2006 | Gross | |
| 2006/0242018 A1* | 10/2006 | Shulman et al. | 705/14 |
| 2006/0242269 A1 | 10/2006 | Gross | |
| 2008/0010173 A1 | 1/2008 | Rendich | |

FOREIGN PATENT DOCUMENTS

WO    WO2004065266    *   4/2004

\* cited by examiner

*Primary Examiner*—F. Ryan Zeender
*Assistant Examiner*—Fateh M Obaid
(74) *Attorney, Agent, or Firm*—Hickman Palermo Truong & Becker LLP (57) ABSTRACT

In an embodiment, a method of processing returned rental inventory items comprises receiving, at a rental item provider and from a set of first customers of the rental item provider, a set of returned rental items that the first customers have returned to the rental item provider after renting the items; predicting a subset of the returned rental items that the rental item provider will need to provide in the future to a set of second customers; creating and storing a record in a computer of the subset of the returned rental items; providing the subset of the returned rental items to the set of second customers without first returning the returned rental items to an inventory of rental items.

19 Claims, 6 Drawing Sheets

FIG. 6

PROCESSING RETURNED RENTAL ITEMS

CROSS-REFERENCE TO RELATED APPLICATIONS

Priority Claim

This application claims benefit of U.S. Provisional Patent Application No. 60/887,332, filed Jan. 30, 2007, the entire contents of which is hereby incorporated by reference as if fully set forth herein, under 35 U.S.C. §119(e).

TECHNICAL FIELD

The present disclosure generally relates to processing returned rental items.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Example approaches for renting items are described in U.S. Pat. Nos. 6,584,450 B1 and 7,024,381 B1, the entire contents of which are hereby incorporated by reference as if fully set forth herein. Mailer envelopes useful in the rental approaches are described in U.S. Pat. No. 6,966,484 B2, the entire contents of which are hereby incorporated by reference as if fully set forth herein. Rental inventory approaches are described in US Patent Publication No. 20050086127, the entire contents of which are hereby incorporated by reference as if fully set forth herein.

The approaches of the '450 patent and '381 patent can be applied to renting disc media such as DVDs, using a rental system in which a plurality of distribution locations ("hubs") store an inventory of disc media. In one such approach, for systems or management of the hubs to know if a particular disc needs to ship or not, the hubs scan bar codes on all the discs that the hubs have in stock. The scanning operation includes discs returned from customer homes the same day as part of a Rental Return process, and all discs in a SAT (Scan Again Tomorrow) Sorting process that were left over from the night before. This process requires scanning a very large number of discs, causing SAT Sorting to become a bottleneck within the hub process.

SUMMARY OF THE DISCLOSURE

In an embodiment, a method of processing returned rental items comprises receiving, at a rental item provider and from a set of first customers of the rental item provider, a set of returned rental items that the first customers have returned to the rental item provider after renting the items; predicting a subset of the returned rental items that the rental item provider will need to provide in the future to a set of second customers; creating and storing a record in a computer of the subset of the returned rental items; providing the subset of the returned rental items to the set of second customers without first returning the returned rental items to an inventory of rental items.

In an embodiment, the rental items are disc media items. In an embodiment, the rental items are DVDs.

In an embodiment, the providing comprises providing the subset of the returned rental items to an order shipment station that processes orders of the set of second customers without first returning the returned rental items to an inventory of rental items. In an embodiment, the method further comprises returning the returned rental items, less the subset, to the inventory of rental items, and then providing the returned rental items, less the subset, to the order shipment station.

In an embodiment, the predicting comprises selecting 80% of the returned rental items that were ordered in a previous processing time period.

In another embodiment, a comprises receiving, at a rental item provider and from a set of first customers of the rental item provider, a set of returned rental items that the first customers have returned to the rental item provider after renting the items; moving a first subset of the returned rental items to a sorting station comprising a sorting machine; predicting a second subset of the returned rental items that the rental item provider will need to provide to a set of second customers; creating and storing a record in a computer of the second subset of the returned rental items; causing shipping the second subset of the returned rental items to the set of second customers without moving the second subset of the returned rental items to the sorting station; at the sorting station, determining whether any of the returned rental items in the first subset, in combination with other rental items that were returned in one or more previous days, are needed to provide to the set of second customers.

In an embodiment, the predicting comprises selecting 80% of a mean number of units of the returned rental items that were ordered in a previous processing time period comprising two or more days.

In other embodiments, the invention encompasses computer-readable media encoded with instructions which, when executed, cause one or more processors to perform some or all of the functions and steps recited above. Other embodiments include computer apparatus configured to perform some or all of the functions and steps recited above.

DETAILED DESCRIPTION

An approach for processing returned rental items is provided. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In an embodiment, a Rental Return Call Out process is provided for distribution locations for rental items. In this context, Rental Return Call Out provides a process of pre-sorting discs that are scanned during Automated Rental Return, to directly ship without being sorted out in the SAT Sorting Operation. The goal of this process to anticipate what discs might be shipped the same day while doing Rental Return, and scan those discs directly in the Shipping sorter without having to scan them in SAT Sorting. Such a process greatly reduces the SAT sort volume. The term "call out" means, for example, to identify a unit of a rental item title using a sorting machine and to cause the sorting machine to move the unit to a specified sorting location or tray, from which the unit can be moved to another location for processing in a different manner. A large number of units may be called out using the sorting machine and moved.

In various embodiments, the Rental Return Call Out process herein provides numerous significant benefits. In one embodiment, Rental Return Call Out allows a hub to reduce the number of discs that are scanned in SAT Sorting each day. As a result, hubs are able to handle more volume and reduce operational costs.

In an embodiment, the Rental Return Call Out process provides for sorting discs twice, at a Rental Return point and Shipping point, rather than three times at Rental Return, Scan Again Tomorrow, and Shipping. As a result, the longevity of discs will improve. In another embodiment, a hub uses a period of idle time at startup to feed called out discs into mailers. "Mailer," in this context, is a mailing envelope for a disc rental item. The idle time may be a period of time between sending a Rental Return start signal and receiving an order file that identifies the day's orders.

Figure 1A:
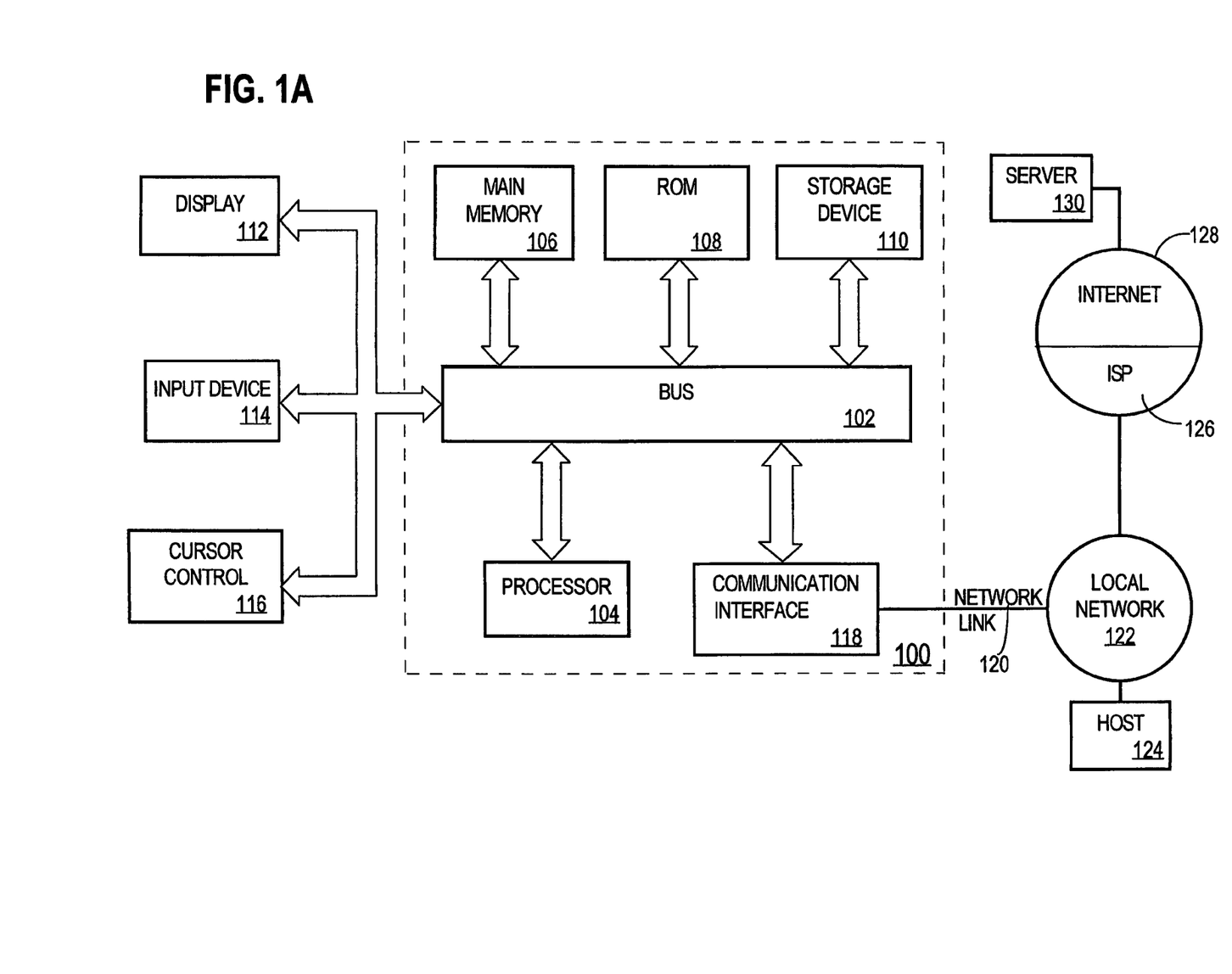
FIG. 1A illustrates a computer system upon which an embodiment may be implemented.

FIG. 1A is a block diagram that illustrates a computer system 100 upon which an embodiment of the invention may be implemented and is described in detail in sections below.

Figure 1B:
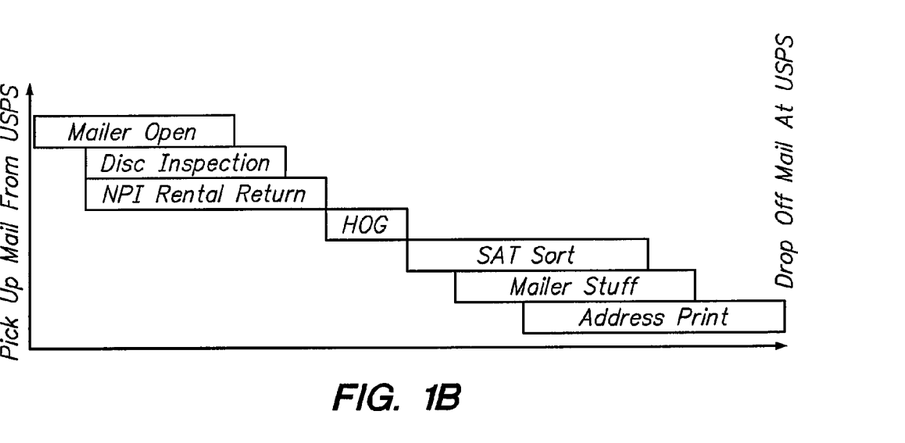
FIG. 1B is a process time diagram that illustrates rental item processing steps that may occur in a hub facility.
Figure 2:
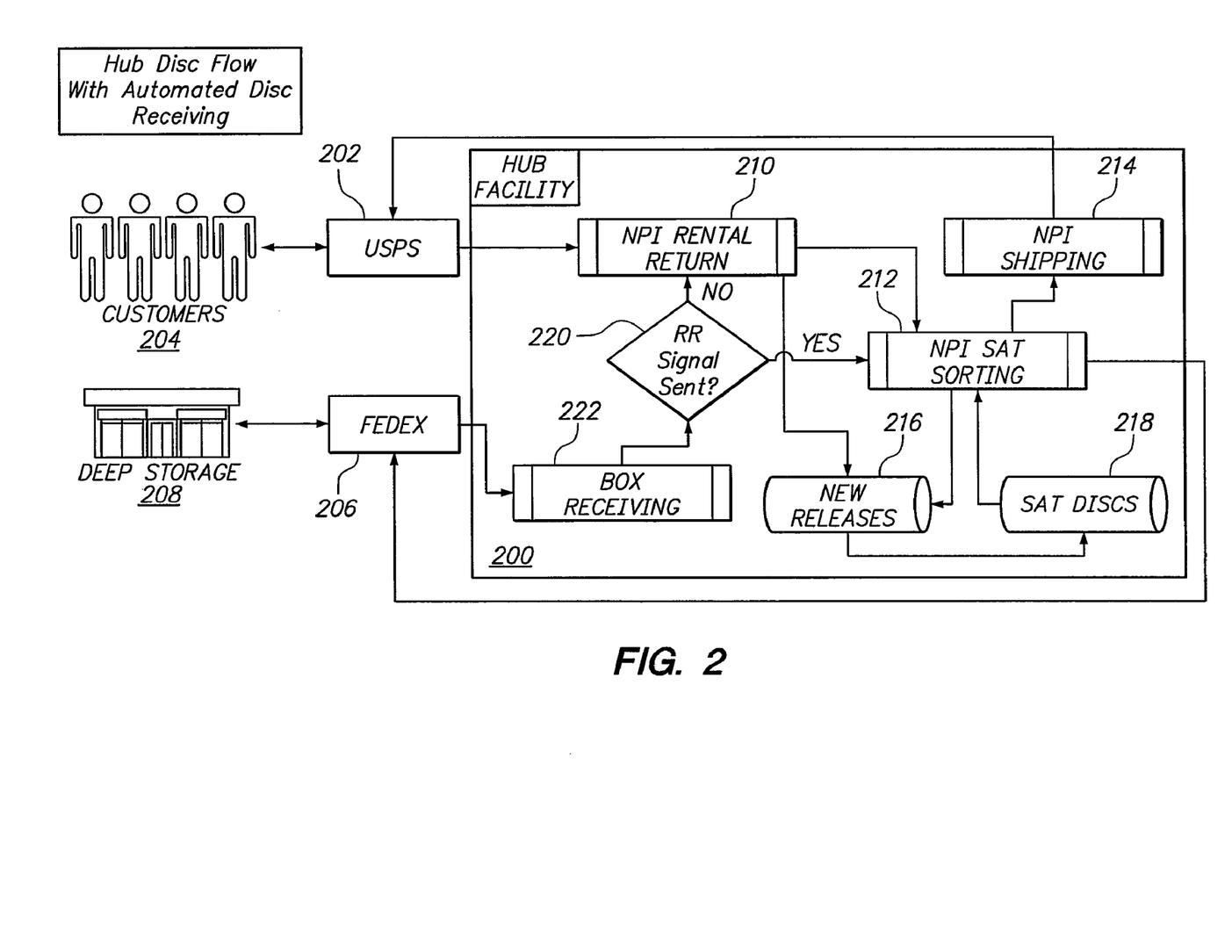
FIG. 2 illustrates a first process flow for disc rental items that is performed during Rental Return.

FIG. 1B is a process time diagram that illustrates rental item processing steps that may occur in a hub facility. FIG. 2 illustrates a first process flow for disc rental items that is performed during Rental Return.

Referring first to FIG. 2, in an embodiment, a hub facility 200 of an item rental service can receive returned rental items by a first delivery mechanism, such as U.S. Postal Service 202, from customers 204. The hub facility is also connected to a deep storage location 208 by a second delivery mechanism, which may be a courier service such as FedEx. Alternative delivery mechanisms include hand delivery, private vehicle service, etc. The hub facility 200 comprises a rental return station 210, scan-again-tomorrow (SAT) station 212, shipping station 214, and receiving station 222. Rental items may be stored in new release storage 216 and SAT storage 218. An item rental provider or item rental service may comprise a plurality of hub facilities 200. The item rental service also may operate one or more satellite hub facilities, each associated with a main hub facility 200.

Referring now to FIG. 1B, steps in processing in a hub facility 200 are shown in separate blocks and organized so that time advances from left to right. In general, mailed returned rental items are received from USPS 202 and then proceed through the following steps. Mailers are opened. Discs are inspected. Rental Return station 210 processes the discs. A Hub Order Generation (HOG) process determines what discs need to ship to which customers in response to orders. A scan-again-tomorrow (SAT) sorting process occurs at SAT sorting station 212 to determine (a) which discs are present and can ship in today's orders; (b) which discs have been received, but are not needed for today's orders and should be scanned again tomorrow to see if they can ship then; (c) which discs should be returned to deep storage 208 because the discs are unlikely to be needed for a long time. Mailers are stuffed with rental items that can ship today. Addresses are printed on the stuffed mailers. The stuffed mailers are provided to USPS 202 for mailing to customers 204.

As seen in FIG. 1B, the process outlined above has certain undesirable dependencies. For example, the SAT Sort operation cannot begin until the Rental Return and HOG processes are complete.

In an embodiment, customers 204 mail back rental items, such as discs, to an item rental provider using mail. USPS 202 delivers the rental items to the hub facility 200, which processes the rental items for re-shipment to a customer the next day, for storage in the hub facility, or for movement to deep storage. The item rental provider enters information about the received discs into a computer system of the item rental provider using automated Rental Return sorting machines at rental return station 210.

In an embodiment, at Rental Return station 210, all received mailers are oriented in the same direction. Each mailer is manually opened and inspected by an operator. The operator inspects the rental item to determine if the rental item is not in a mailer associated with a customer who rented the rental item (mismatch), if the rental item is cracked or scratched, if the rental item contains a note from the customer, if the mailer contains a disc with no sleeve, a sleeve with no disc, a dirty disc, etc. Discs that are in good condition are placed in a sorting machine to be scanned so that data from the disc envelope can enter an inventory control computer system.

Discs coming from Deep Storage 208 might also be processed at the rental return station 210. Deep Storage 208 is a repository of rental items that are rarely requested by customers. In an embodiment, rental items move from deep storage 208 via FedEx 206 and arrive at the box receiving station 222. At the box receiving station, the rental items are removed from shipping boxes and scanned using a bar code scanner. A computer system coupled to the box receiving station 222 determines whether a rental return signal has been sent for each item received from deep storage 208. If an item does not have a rental return signal, then the item is moved to the rental return station 210 for processing. If the item does have a rental return signal, then the item is needed to fulfill a pending customer order and is moved to SAT sorting station 212. This process ensures that the item formerly in deep storage will be available for shipment today or the next day.

After processing at Rental Return station 210, an order generation process runs and produces an order file that the hub facility 200 uses to drive automated sorting equipment at the Shipping station 214 and SAT sorting station 212. The order generation process may be implemented as a scheduled software program that runs on a computer system in the hub facility 200 or in a centralized location that serves multiple hub facilities. However, all discs that were scanned at Rental Return station 210 are provided to the SAT Sorting station 212 to find out which discs need to ship to customers today. Discs that are not needed for shipment on the current day may be moved to SAT storage 218, to be scanned again tomorrow, or can be returned to deep storage 208. Discs may be returned to deep storage 208, for example, when the discs represent rarely rented items or items for which the hub 200 already has a large inventory on hand.

At a Shipping station 214, operators manually stuff discs with orders into mailers. At the time of stuffing, the mailers do not have a customer address printed on them. However, in an embodiment, a bar code on the disc sleeve shows through a window on the mailer. The mailers are sealed using adhesive sealing strips integrated into the mailers, and a tab label is applied to ensure that the mailer does not open in transit.

Also at Shipping station 214, the mailers are then placed into a sorting machine, such as an NPI postal sorting machine, which reads the bar codes, interacts with a host computer to determine a customer address for the disc identified in the mailer, and automatically prints customer address information on the mailer. The mailers are simultaneously sorted to facilitate postal processing into trays according to destination, such as by ZIP code, to facilitate handling by USPS 202. In an embodiment, postal sorting includes automatic optical reading of the printed address and verification of the address against a postal address database.

In an embodiment, unprocessed mailers are sorted into a dedicated sorting location for evaluation by personnel of the hub 200. Examples of unprocessed mailers include mailers containing discs without orders, mailers for which the sorting machine could not read the bar code, and mailers for which the printed address could not be verified.

In an embodiment, the sorting machine also automatically signals the host computer to send a confirmation e-mail message to the customer specifying that a particular rental item has shipped to the customer. The e-mail message may include an expected delivery date. In an embodiment, the expected delivery date is determined by determining the present date and time at which the mailer was scanned at the time of stuffing, and adding the date value to an estimated number of delivery days from the shipping hub 200 to the customer's 3-digit ZIP code, factoring in all USPS non-working days, such as holidays. The estimated number of delivery days from the shipping hub 200 to each 3-digit ZIP code may be stored in a look-up table of data accessible to the host computer for the sorting machine.

In an embodiment, a rental return callout process directly moves discs to the Shipping station 214 after the discs are scanned at the Rental Return station 210. The process predicts which discs have a high chance to be shipped the same day, so that those discs can skip the SAT sorting station 212. In an embodiment, the prediction is performed before the order generation process runs, so that the prediction process does not have access to information about actual orders requiring fulfillment on the current day. Thus, in an embodiment, the rental return callout process:

anticipates what rental item titles will be returned on a particular day;
  determines what mailers these rental items should be stuffed into;
  gives priority to assigning orders to these rental items; and
  allows mailers to be stuffed with these rental items before the hub order generation process runs.

Figure 3:
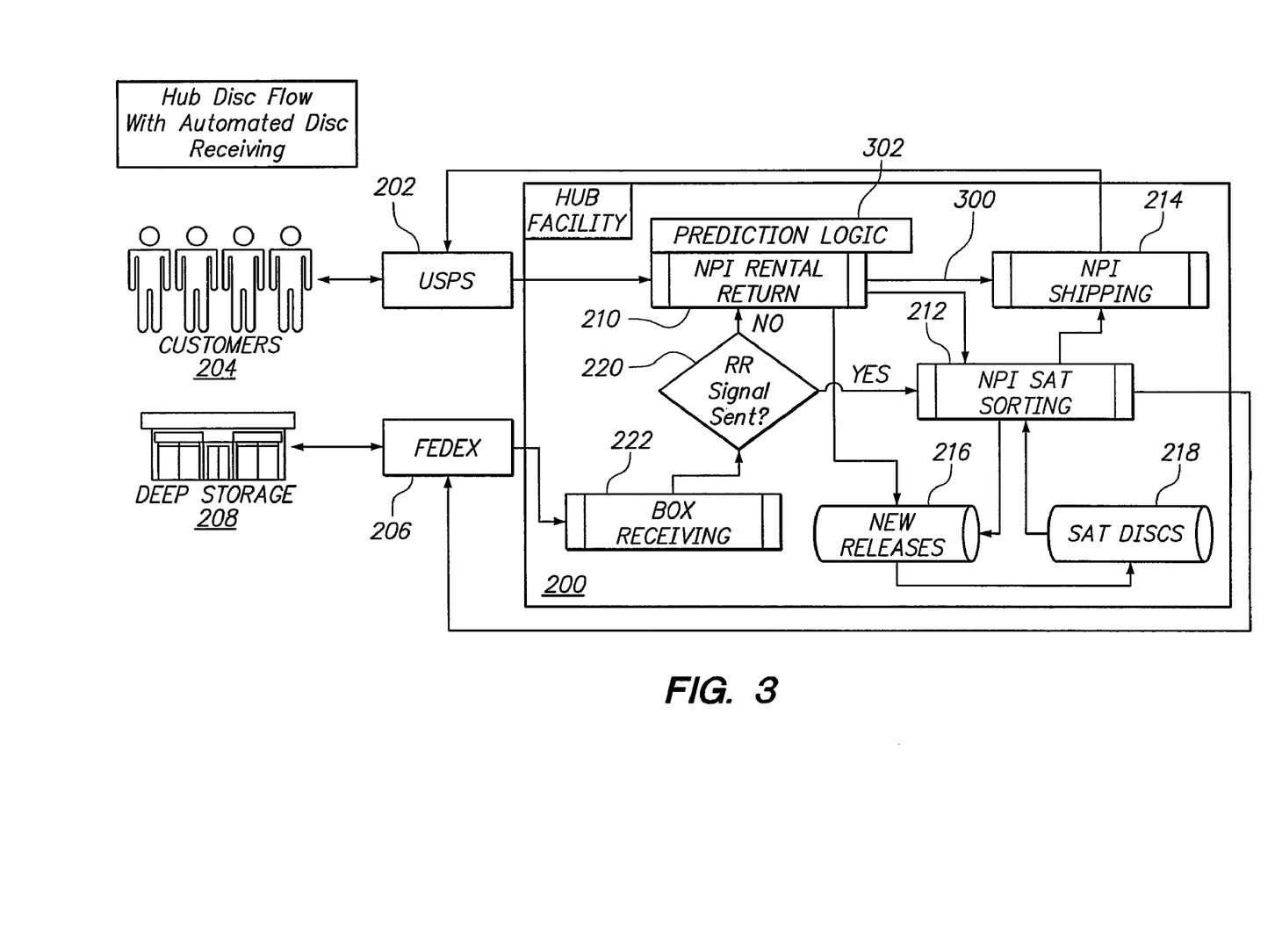
FIG. 3 illustrates a second process flow for disc rental items that is performed during Rental Return.

FIG. 3 a second process flow for disc rental items that is performed during Rental Return according to an embodiment. In FIG. 3, the Rental Return station 210 is connected to the Shipping station by arrow 300. The arrow 300 represents a flow of discs that skip SAT sorting. Further, Rental Return station 210 comprises or is coupled to prediction logic 302, which is configured to predict for each hub and rental item title what quantity of discs would have a high chance to ship the next day.

For example, if a hub 200 shipped 400 orders of DVD discs (units) of the movie Spiderman (rental item title) today, it might be safe to predict that the item rental provider will need to ship at least 300 orders tomorrow. Therefore, as discs are returned tomorrow and arrive at Rental Return station 210, the item rental provider should call out 300 of them at Rental Return station 210, place them in mailers and move them directly to the shipping sorters at Shipping station 214 without performing Scan Again Tomorrow scanning or sorting at SAT Sorting station 212 to see if they are actually needed for orders. The process assumes that about 300 orders will exist, and those orders can be fulfilled more rapidly moving the items to the Shipping station 214 to address and ship the rental item units.

In an embodiment, the following algorithm is implemented in the prediction logic 302 for predicting the number of units of a rental item to call out. For each rental item title, a floor value is selected as 80% of the total number of discs or other rental item units that were ordered for the previous day. The floor value is the number of discs to call out for that title. If any title had less then five shipments, then that title is not included in the call out. All order types are included.

In other embodiments, different floor values may be used. For example, the floor value may range from a small percentage to more than 100%. The floor value can take into account a trend of increasing rental or a trend of decreasing rental.

In experimentation, the inventors determined that the preceding approach produced about 1.85% of over-packed discs—that is, discs called out for which the system did not find an order and therefore did not need to call out—and a 54% call out ratio. The 54% call out ratio means that 54% of rental returned discs were called out and therefore skipped SAT sorting. As a result, a significant improvement in efficiency of the hub 200 and reduced operating time may be expected.

In an embodiment, the predicted number of rental items for a particular rental item title may comprise the mean total number of rental items actually shipped for the same rental item title over the previous N days, where N is a scalar value selected from the range of 1 to 30 in various embodiments. Using a mean value may enable a hub 200 to predict shipping a larger number of units of a particular rental item today as opposed tomorrow, which can occur when a historical trend of renting that item indicates increased demand. In still another embodiment, the mean number of units may be reduced to prevent over-retention of units; for example, 80% of the mean number of units may be predicted or called out.

In this manner, by telling an order generation process which discs were called out and to which hub or satellite hub has the discs, orders can be allocated to those discs first.

Figure 5:
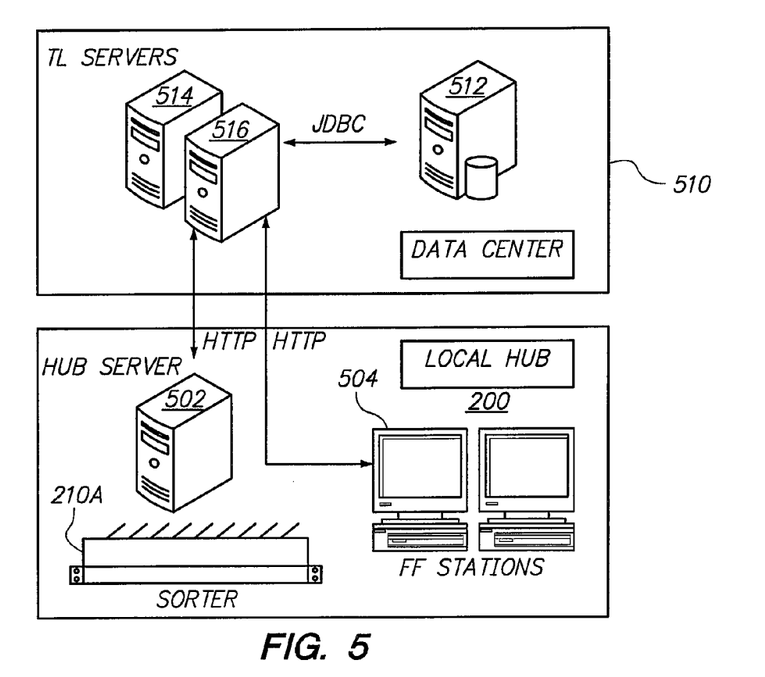
FIG. 5 illustrates a first example embodiment of a server architecture that can be used to implement aspects of the rental return callout process described herein.
Figure 6:
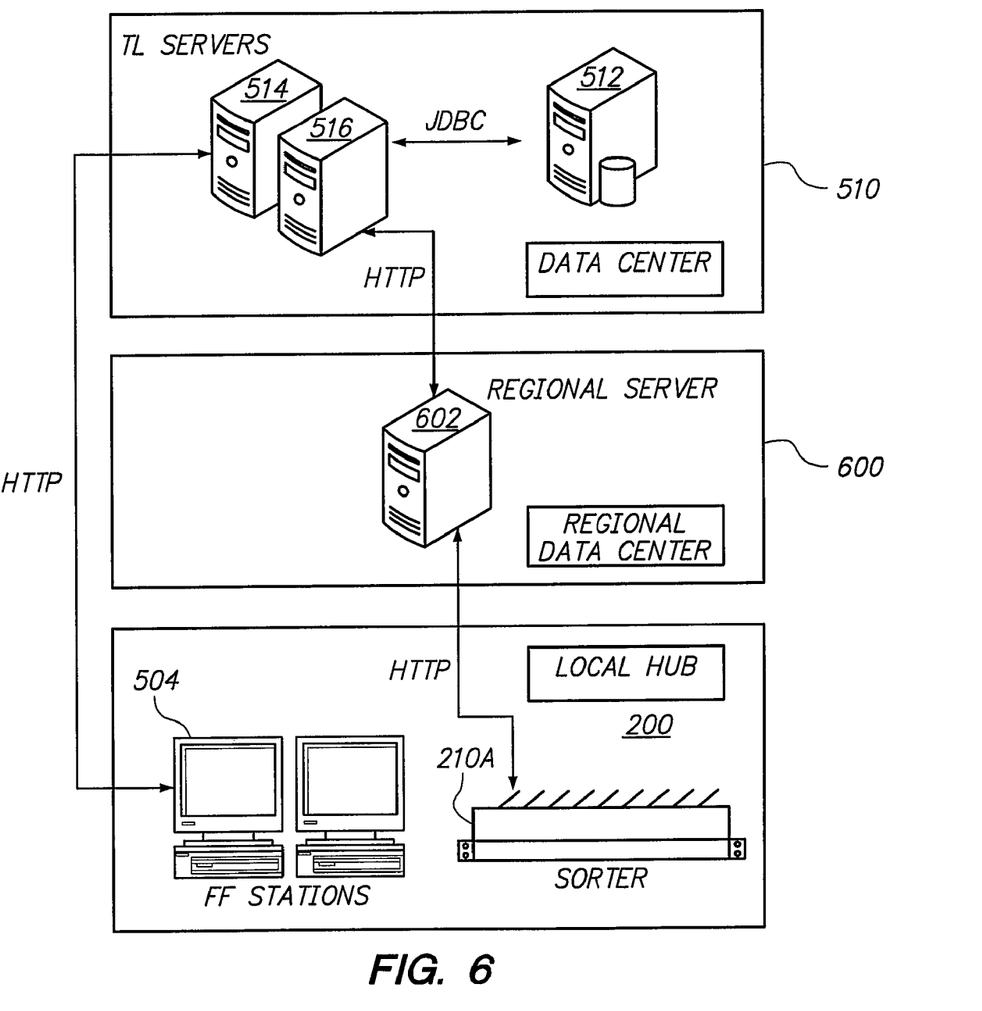
FIG. 6 illustrates a second example embodiment of a server architecture that can be used to implement aspects of the rental return callout process described herein.

Prediction logic 302 may be implemented as a Java® computer program hosted on a computer having a large memory cache that is coupled directly or indirectly through one or more networks to one or more sorting machines, such as NPI postal sorting machines. In an embodiment, prediction logic 302 is hosted on a hub server or regional server as shown in FIG. 5, FIG. 6.

In certain cases, the Rental Return call out prediction may be too aggressive, and will call out more discs than the item rental provider can allocate to orders. In that case, the item rental provider will have mailers processed at a mail print point, with no address printed on them, so they will be rejected for shipment. Hub 200 will keep the discs in the mailers and will try to ship them again the next day. Until the discs are processed at the SAT Sorting station 212, the discs are still considered as "call out" discs in the system.

In an embodiment, the prediction logic 302 executes at night and considers the quantity of "Call out" discs left over while predicting the quantity of discs to sort out for the next day.

Throughout this description, "night" and "day" can refer to any time periods in which item processing is inactive and active, respectively. Embodiments are not required to actually operate at nighttime or daytime and can use any item processing time period.

In an embodiment, the following process is used.

1. The night before a particular item processing day, prediction logic 302 executes and predicts, for each movie title, the quantity of discs to call out the next day per hub facility 200 and for each satellite hub. The resulting data is stored in a table for later access. The prediction logic 302 considers previously called out discs that are not yet shipped. Thus, if the prediction logic 302 determines that 300 copies of Spiderman are needed for the next day, and stored data indicates that 200 copies of Spiderman were previously called out and are not yet shipped, then the prediction logic modifies its prediction as (300−200)=100 copies to call out.

2. Before the hub 200 starts, a server computer loads into a memory cache all the title information required for that hub. Title information includes titles of rental items, the identity of a satellite hub and hub and the association of the satellite hubs to main hubs, and the quantity of discs to call out for each title.

3. As the hub 200 starts the rental return process at Rental Return station 210 in response to receiving returned rental items from customers 204, the server computer instructs one or more sorting machines at rental return station to move discs to appropriate bins to result in calling out or sorting out the quantity of discs specified in the cache. Any number of sorting machines may be used at station 210 and controlled by the server computer. In an embodiment, NPI postal mail sorting machines are used with modifications to accommodate DVD discs in mailer sleeves as the sorted items.

4. Called out discs are directly inserted into mailers in preparation of mail printing at Shipping station 214. The other discs are provided to the SAT Sorting station 212.

5. Discs sorted out for call out are flagged as called out in a database that is coupled to the server computer. In an embodiment, an Order Generation process hosted on a centralized computer is also coupled to the database. As a result, the Order Generation process can recognize the discs that were sorted out for call out.

6. The hub 200 sends an Order Generation signal to a centralized computer that manages order generation for all of a plurality of hubs. In response, an order allocation process starts at the centralized computer and allocates discs to customers in the following priority: Called out discs; Returned discs same day; SAT discs; Excess Inventory discs. The centralized computer communicates to the hub 200 an order file identifying all discs and orders for that particular hub. Other hubs receive different order files.

7. Once the hub 200 receives its order file, any pre-packaged mailers (with called out discs inside) are scanned at the Shipping station 214. If the order file specifies that one of the pre-packaged mailers and discs is required to ship to a customer for a pending order, then a customer address is printed on the mailer at the Shipping station 214 and the mailer is shipped to one of the customers 204. If a pre-packaged mailer passes through the Shipment station 214 and shipment does not occur because that mailer is not needed for a customer order, then no customer address is printed on that mailer, causing the shipment sorter to reject the discs at Shipment station 214.

8. Discs that are called out but have no associated order are kept for the next working day where such discs will normally ship to customers. In an embodiment, such discs are moved to SAT storage 218 for scanning again the next day. However, discs not shipping for several days can be scanned by the hub at any station other than the Shipping station, including the Rental Return station, SAT Sorting station, etc., change the state of the discs to SAT again.

9. Called-out discs that are not scanned every day in Shipping station 214 are flagged as "Misplaced" by the end of the day. These discs may be returned to deep storage 208.

Figure 4:
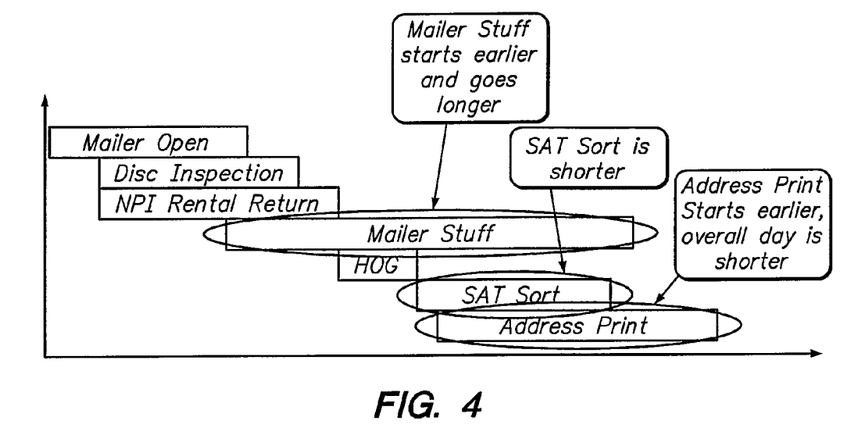
FIG. 4 is a time diagram illustrating the processes of FIG. 1B when applied in the context of FIG. 3, so that certain benefits of the present approach are apparent.

FIG. 4 is a time diagram illustrating the processes of FIG. 1B when applied in the context of FIG. 3, so that certain benefits of the present approach are apparent. As seen in FIG. 4, the mailer stuffing process can begin immediately after the rental return process for at least some rental items that are needed the same day. Further, since the rental return callout process herein results in processing some rental items before the HOG process runs, the SAT Sorting process is shorter because fewer rental items need to be processed at that stage. Moreover, after completing processing at Rental Return station 210, the hub 200 is not required to wait and take no action until the HOG process completes; there is no "dead time" because the hub can immediately process those rental items that were called out. Address printing can begin earlier because the rental items identified in the rental return callout process become available for stuffing, printing and shipping at an earlier point in time. Therefore, the overall time required for processing all rental items is reduced and the hub 200 can complete a day's work in fewer hours.

FIG. 5 illustrates a first example embodiment of a server architecture that can be used to implement aspects of the rental return callout process described herein. FIG. 6 illustrates a second example embodiment of a server architecture that can be used to implement aspects of the rental return callout process described herein.

Referring first to FIG. 5, a Hub Server Architecture is used in which a hub 200 comprises a hub server computer 502 coupled to one or more sorters 210A. One or more Transport Layer (TL) servers 514, 516 are located in a data center 510 that serves multiple hubs 200. A centralized production database computer 512 in the data center 510 stores rental item title and inventory information for all rental items, units, and hubs, and is coupled by a high-speed local network connection to the TL servers 514, 516. Java database call protocol (JDBC) may be used for communication between the TL servers 514, 516.

In an embodiment, the sorter 210A communicates using HTTP with the local hub server computer 520, which communicates using HTTP to the Transport Layer servers 514, 516. The TL servers 514, 516 serve as a front-end by which the hub 200 accesses data stored in the production database computer 512. In an embodiment, one or more Factory Fusion (FF) stations 504 communicate using HTTP with the TL servers 514, 516. Operations personnel in local hub 200 use the FF stations 504 to perform inventory management functions for rental items and to interact with other elements of FIG. 2.

In an embodiment, TL servers 514, 516 implement a Factory Fusion application program that implements inventory management functions based on receiving unit counts and other data from the sorting machines at all stations of the hub 200. The Factory Fusion program may comprise the prediction logic 302, but other embodiments may host the prediction logic independently. Example functions of the Factory Fusion program may comprise displaying a number of units received from customers, a number of units called out, the number of operators in the hub, the time that the hub sent a request signal to start the hub order generation process, the number of units scanned at the SAT Sorting station 212, the total units to ship at Shipping station 214, and other statistical information. The particular functions of the Factory Fusion are not critical, and the prediction logic 302 can be integrated into or coupled to any other inventory control program, or used independently.

In an embodiment, hub server 502 hosts the prediction logic 302 described above with respect to FIG. 3, and the hub server controls operation of the sorter 210A. For example, given a specified predicted number of units of a particular rental item title, the hub server 502 and prediction logic 302 interact to cause the sorter 210A to move the specified number of units of that title to a particular sort-out tray or location of the sorter. Hub personnel can then move the contents of the sort-out tray to the Shipping station 214, including while waiting for the hub order generation process to execute and provide an order file to the hub.

A primary benefit of this implementation is that the server 502 is in the same building as the sorters 210A so there is almost no network latency and the server stays accessible even if a network connection of the hub 200 to the data center 510 goes down.

Additionally or alternatively, an architecture comprising one or more regional servers can be used as shown in FIG. 6. In the embodiment of FIG. 6, several regional servers 602 are located across a geographical region. For example, a regional server 602 in California could be used for all hubs 200 located on the West Coast, given sufficient response time to communicate with sorters 210A. In this embodiment, a sorter 210A communicates using HTTP with the regional server 602, which communicates using HTTP with the Transport Layer servers 514, 516. The local hub 200 does not contain a hub server 502 as in FIG. 5.

The architecture of FIG. 6 requires fewer servers. The servers 602 reside in data centers and therefore the servers are easier to manage than hub servers 502; the data centers are responsible to monitor the servers 602 and keep the servers operating continuously. In an embodiment, the number of servers 602 is selected so that round trip network latency does not exceed a maximum allowable latency of the sorters 210A, e.g., 30 ms to 70 ms.

In an embodiment, regional server 602 hosts the prediction logic 302 described above with respect to FIG. 3, and the regional server controls operation of the sorter 210A by providing commands over a network that connects the local hub 200 to the regional data center 600. For example, given a specified predicted number of units of a particular rental item title, the regional server 602 and prediction logic 302 together cause the sorter 210A to move the specified number of units of that title to a particular sort-out tray or location of the sorter. Hub personnel can then move the contents of the sort-out tray to the Shipping station 214, including while waiting for the hub order generation process to execute and provide an order file to the hub.

In the embodiment of either FIG. 5 or FIG. 6, there may be any number of sorters 210A, any number of local hubs 200, and in FIG. 6, any number of regional data centers. The particular number of computers, data centers and hubs shown in FIG. 5 and FIG. 6 are illustrated solely to provide a clear example and not to set forth limitations.

In an embodiment, a software system such as the Factory Fusion application provides the following reporting functions.

Report #1: Call out discs daily Status
On top level:
Quantity of called out discs.
Quantity of called out titles.
Percentage of called out discs compare to total RR discs (RR+Pre-positioning).
Quantity of called out discs not allocated by end of day.
Quantity of called out titles not allocated by end of day.
Percentage of not allocated disc compare to total call out quantity
On second level after clicking on not allocated discs quantity link for a particular day and hub (this level displays the list of titles not entirely allocated for a particular hub and day).
Titles not allocated.
Qty discs not allocated to orders and called out per title.
Qty discs called out per title.
Percentage of discs non allocated compare to discs called per title.

FIG. 1A is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory ("RAM") or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory ("ROM") 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube ("CRT"), for displaying information to a computer user. An input device 114, including alphanumeric and other keys, is coupled to bus 102 for communicating information and command selections to processor 104. Another type of user input device is cursor control 116, such as a mouse, trackball, stylus, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for processing returned rental items. According to one embodiment of the invention, processing returned rental items is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any data storage medium that participates in providing instructions to processor 104 for execution. Such a medium may take many forms, including but not limited to non-volatile media and volatile media. Non-volatile media includes, for example, optical or magnetic disks, such as storage device 110. Volatile media includes dynamic memory, such as main memory 106.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector can receive the data carried in the infrared signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network ("ISDN") card or a modem to provide a data communication connection to a corresponding type of telephone line. As another example, communication interface 118 may be a local area network ("LAN") card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider ("ISP") 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for processing returned rental items as described herein.

The received code may be executed by processor 104 as it is received, and/or stored in storage device 110, or other non-volatile storage for later execution. In this manner, computer system 100 may obtain application code.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-readable storage medium storing computer-executable instructions which, when executed by one or more processors, cause the one or more processors to perform:
   receiving information about a set of returned rental items that a first set of customers have returned to a rental item provider after renting the items;
   predicting a subset of the returned rental items that the rental item provider will need to provide in the future to a set of second customers, wherein the predicting is based on information about orders for rental items but not based on outstanding orders for the subset of the returned rental items from the set of second customers;
   creating and storing a record in a computer of the subset of the returned rental items;
   causing the returned rental items, less the subset, to be returned to an inventory of rental items, and causing the subset of the returned rental items to be provided to an order shipment station that processes orders of the set of second customers without first returning the subset of the returned rental items to an inventory of rental items by generating and sending one or more commands to one or more sorting machines at a rental return station to move a number of rental items, equivalent to the predicted subset of the returned rental items, to one or more bins associated with the one or more sorting machines.

2. The computer-readable storage medium of claim 1, wherein the rental items are disc media items.

3. The computer-readable storage medium of claim 2, wherein the rental items are DVDs.

4. The computer-readable storage medium of claim 1, wherein predicting the subset includes predicting a first quantity of rental items to call out for a particular title and reducing the first quantity by a second quantity of rental items that were called out for the particular title in a previous work session.

5. The computer-readable storage medium of claim 1, further comprising instructions for:
   creating and storing a record that gives a highest priority to assigning orders to the subset of the returned rental items.

6. The computer-readable storage medium of claim 1, wherein predicting comprises selecting 80% of the returned rental items that were ordered in a previous processing time period.

7. A method, comprising:
   receiving information about a set of returned rental items that a first set of customers have returned to a rental item provider after renting the items;
   a computer predicting a subset of the returned rental items that the rental item provider will need to provide in the future to a set of second customers, wherein the predicting is based on information about orders for rental items but not based on outstanding orders for the subset of the returned rental items from the set of second customers;
   creating and storing a record in a computer of the subset of the returned rental items;

a computer causing the returned rental items, less the subset, to be returned to an inventory of rental items, and causing the subset of the returned rental items to be provided to an order shipment station that processes orders of the set of second customers without first returning the subset of the returned rental items to an inventory of rental items by generating and sending one or more commands to one or more sorting machines at a rental return station to move a number of rental items, equivalent to the predicted subset of the returned rental items, to one or more bins associated with the one or more sorting machines.

8. The method of claim 7, wherein the rental items are disc media items.

9. The method of claim 8, wherein the rental items are DVDs.

10. The method of claim 7, wherein predicting the subset includes predicting a first quantity of rental items to call out for a particular title and reducing the first quantity by a second quantity of rental items that were called out for the particular title in a previous work session.

11. The method of claim 7, further comprising:
creating and storing a record in a computer that gives a highest priority to assigning orders to the subset of the returned rental items.

12. The method of claim 7, wherein predicting comprises selecting 80% of the returned rental items that were ordered in a previous processing time period.

13. A method, comprising:
receiving information about a set of returned rental DVDs that a set of first customers have returned to a rental item provider after renting the DVDs;
a computer predicting a subset of the returned rental DVDs that the rental item provider will need to provide in the future to a set of second customers, wherein the predicting is based on information about orders for rental DVDs but not based on outstanding orders for the subset of the returned rental DVDs from the set of second customers;
a computer creating and storing a record in a computer of the subset of the returned rental DVDs;
a computer causing the returned rental DVDs, less the subset, to be returned to an inventory of rental DVDs, and causing the subset of the returned rental DVDs to be provided to an order shipment station that processes orders of the set of second customers without first returning the subset of the returned rental DVDs to an inventory of rental DVDs by generating and sending one or more commands to one or more sorting machines at a rental return station to move a number of rental DVDs, equivalent to the predicted subset of the returned rental DVDs, to one or more bins associated with the one or more sorting machines.

14. The method of claim 13, wherein predicting comprises selecting as the subset a number of the returned rental DVDs equal to 80% of DVDs ordered in a previous processing time period.

15. The method of claim 13, wherein predicting comprises excluding titles of the returned rental DVDs that were ordered fewer than a specified minimum quantity in a previous processing time period.

16. The method of claim 13, wherein predicting the subset includes predicting a first quantity of DVDs to call out for a particular title and reducing the first quantity by a second quantity of DVDs that were called out for the particular title in a previous work session.

17. The method of claim 13, further comprising a computer determining what mailer envelopes into which the subset of the returned rental DVDs should be stuffed.

18. The method of claim 13, further comprising a computer creating and storing a record that gives a highest priority to assigning orders to the subset of the returned rental DVDs.

19. The method of claim 13, wherein predicting comprises selecting a mean number of the returned rental DVDs that were ordered in a previous processing time period of two (2) or more days.

* * * * *